US012782724B2

(12) United States Patent
Narushima

(10) Patent No.: US 12,782,724 B2
(45) Date of Patent: Nov. 3, 2026

(54) VEHICLE DISPLAY DEVICE

(71) Applicant: YAZAKI CORPORATION, Tokyo (JP)

(72) Inventor: Noriaki Narushima, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 212 days.

(21) Appl. No.: 18/754,166

(22) Filed: Jun. 26, 2024

(65) Prior Publication Data

US 2024/0345391 A1 Oct. 17, 2024

Related U.S. Application Data

(63) Continuation of application No. PCT/JP2023/007971, filed on Mar. 3, 2023.

(30) Foreign Application Priority Data

Mar. 9, 2022 (JP) ................................ 2022-036014

(51) Int. Cl.
*G02B 27/01* (2006.01)
*B60K 35/22* (2024.01)
(Continued)

(52) U.S. Cl.
CPC .......... *G02B 27/0101* (2013.01); *B60K 35/22* (2024.01); *B60K 35/23* (2024.01);
(Continued)

(58) Field of Classification Search
CPC .......... G02B 27/0101; G02B 2027/011; G02B 2027/0118; G02B 2027/012; G02B 27/01;
(Continued)

(56) References Cited

U.S. PATENT DOCUMENTS 4,978,214 A * 12/1990 Kawata .................... G09F 9/00
428/31
6,989,934 B2 * 1/2006 Aoki .................. G02B 27/0101
359/629
(Continued)

FOREIGN PATENT DOCUMENTS

JP H04-57881 U 5/1992
JP 2007-272061 A 10/2007
(Continued)

OTHER PUBLICATIONS

International Search Report for PCT/JP2023/007971 dated Apr. 18, 2023.

*Primary Examiner* — Balram T Parbadia
(74) *Attorney, Agent, or Firm* — KENEALY VAIDYA LLP

(57) ABSTRACT

A vehicle display device includes a housing, an image display device, a mirror, and a transparent cover disposed in an opening of the housing, in which the cover has an outer surface and an inner surface and has a shape curved, a light-blocking wall shields the outer surface from first external light, the inner surface is a free-form surface formed to correct image distortion or aberration, an angular difference between the inner surface and the outer surface in the cross section is a value within a range in which second external light can be blocked by the light-blocking wall, and the second external light is external light reflected along an optical path toward an eye point in a case where it is assumed that the external light is incident on the cover and reflected by the inner surface, in external light transmitted through a windshield toward the cover.

5 Claims, 8 Drawing Sheets

(51) Int. Cl.
*B60K 35/23* (2024.01)
*B60K 35/50* (2024.01)
*B60K 35/60* (2024.01)
*B60K 35/80* (2024.01)

(52) U.S. Cl.
CPC .............. *B60K 35/50* (2024.01); *B60K 35/60* (2024.01); *B60K 35/80* (2024.01); *G02B 2027/011* (2013.01)

(58) Field of Classification Search
CPC ........ B60K 35/22; B60K 35/23; B60K 35/50; B60K 35/60; B60K 35/80; B60K 35/00
See application file for complete search history.

(56) References Cited

U.S. PATENT DOCUMENTS

| | | | | |
|---|---|---|---|---|
| 8,289,229 | B2 | 10/2012 | Ishikawa et al. | |
| 10,012,837 | B2 * | 7/2018 | Kuwabara | B60K 35/231 |
| 2007/0229394 | A1 | 10/2007 | Ishikawa et al. | |
| 2008/0049331 | A1 * | 2/2008 | Nakamura | G02B 27/0101 359/630 |
| 2008/0238814 | A1 * | 10/2008 | Ishikawa | G02B 27/0101 345/7 |
| 2011/0317273 | A1 | 12/2011 | Kasai et al. | |
| 2019/0258059 | A1 | 8/2019 | Takahashi | |

FOREIGN PATENT DOCUMENTS

| | | | |
|---|---|---|---|
| JP | 2008-268883 | A | 11/2008 |
| JP | 2010-208580 | A | 9/2010 |
| JP | 2019-098923 | A | 6/2019 |
| JP | 2019-144413 | A | 8/2019 |

* cited by examiner

VEHICLE DISPLAY DEVICE

CROSS-REFERENCE TO RELATED APPLICATION

This application is a continuation application of International Application No. PCT/JP2023/007971 filed on Mar. 3, 2023 which claims the benefit of priority from Japanese Patent Application No. 2022-036014 filed on Mar. 9, 2022 and designating the U.S., the entire contents of which are incorporated herein by reference.

BACKGROUND OF THE INVENTION

1. Field of the Invention

The present invention relates to a vehicle display device.

2. Description of the Related Art

Hitherto, there is a vehicle display device such as a head-up display. Japanese Patent Application Laid-open No. 2008-268883 discloses a head-up display device including optical means that gives an optical effect to light in a preset specific direction and transmits the light, and image projection means that projects image light to reflection means via the optical means.

It is desirable that display quality can be improved without increasing the number of components of the vehicle display device. For example, if distortion or the like of an image can be corrected by a transparent cover provided in a housing, addition of a component becomes unnecessary. Here, when the shape of the cover is designed based on the correction function, it is necessary to pay attention so that ghosting due to external light does not occur.

SUMMARY OF THE INVENTION

An object of the present invention is to provide a vehicle display device capable of achieving both improvement in image quality and suppression of ghosting.

In order to achieve the above mentioned object, a vehicle display device according to one aspect of the present invention includes: a housing that is mounted on a vehicle and has an opening facing a windshield; an image display device that is disposed inside the housing and outputs display light of an image; a mirror that is disposed inside the housing, faces the windshield via the opening, and reflects the display light toward the windshield; and a transparent cover that is disposed in the opening, wherein the housing is disposed in such a way that a light-blocking wall provided in the vehicle extends from a vehicle front side end portion of the opening toward an upper side of the vehicle, the cover has an outer surface facing the windshield and an inner surface facing the mirror, and has a shape curved toward an inside of the housing in a cross section orthogonal to an image lateral direction, the light-blocking wall shields the outer surface from first external light, the first external light is external light reflected by the outer surface along an optical path toward an eye point of the vehicle in external light transmitted through the windshield toward the cover in a case where it is assumed that there is no light-blocking wall, the inner surface is a free-form surface formed to correct distortion or aberration of the image, an angular difference between the inner surface and the outer surface in the cross section is a value within a range in which second external light is blocked by the light-blocking wall, and the second external light is external light that is reflected along the optical path toward the eye point in a case where it is assumed that the external light is incident on the cover and reflected by the inner surface, in external light transmitted through the windshield toward the cover.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a vehicle display device according to an embodiment of the present invention will be described in detail with reference to the drawings. Note that the present invention is not limited by the embodiment. In addition, constituent elements in the following embodiment include those that can be easily assumed by those skilled in the art or those that are substantially the same.

Embodiment

Figure 1:
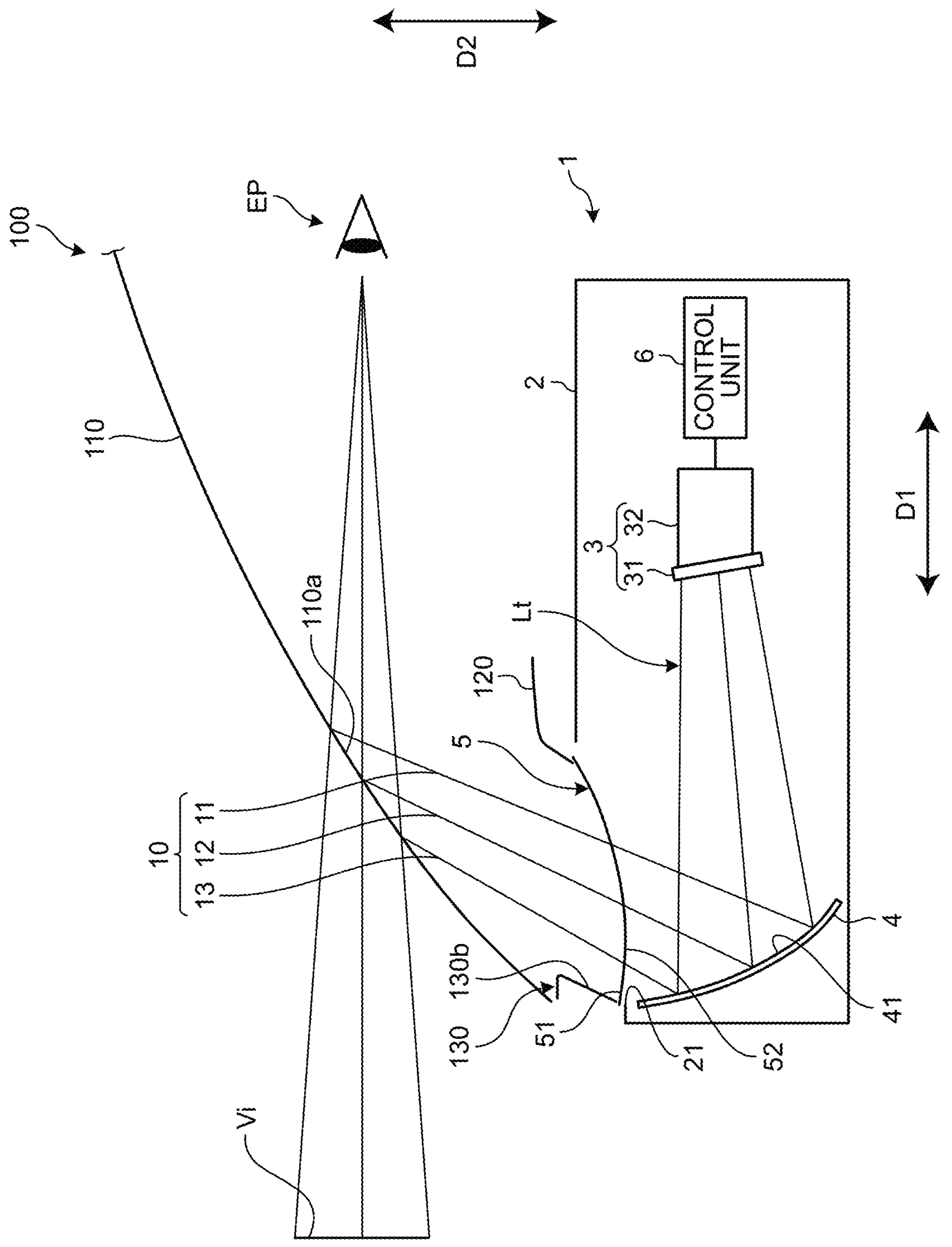
FIG. 1 is a view illustrating a vehicle on which a vehicle display device according to an embodiment is mounted.
Figure 2:
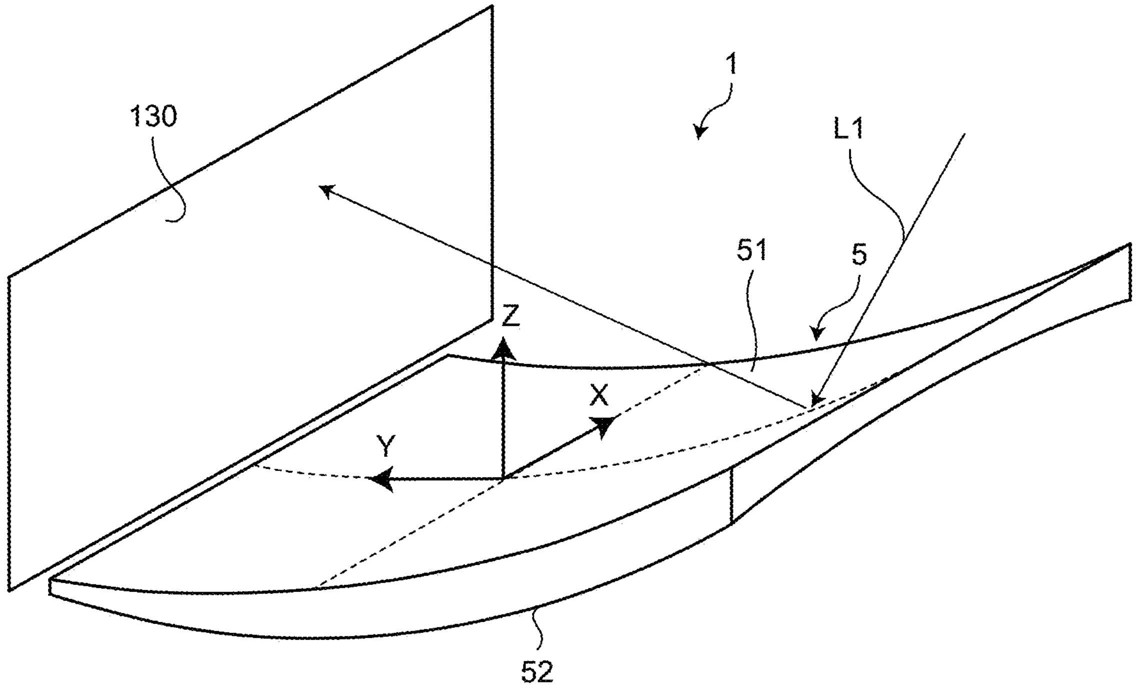
FIG. 2 is a perspective view of the vehicle display device according to the embodiment.
Figure 3:
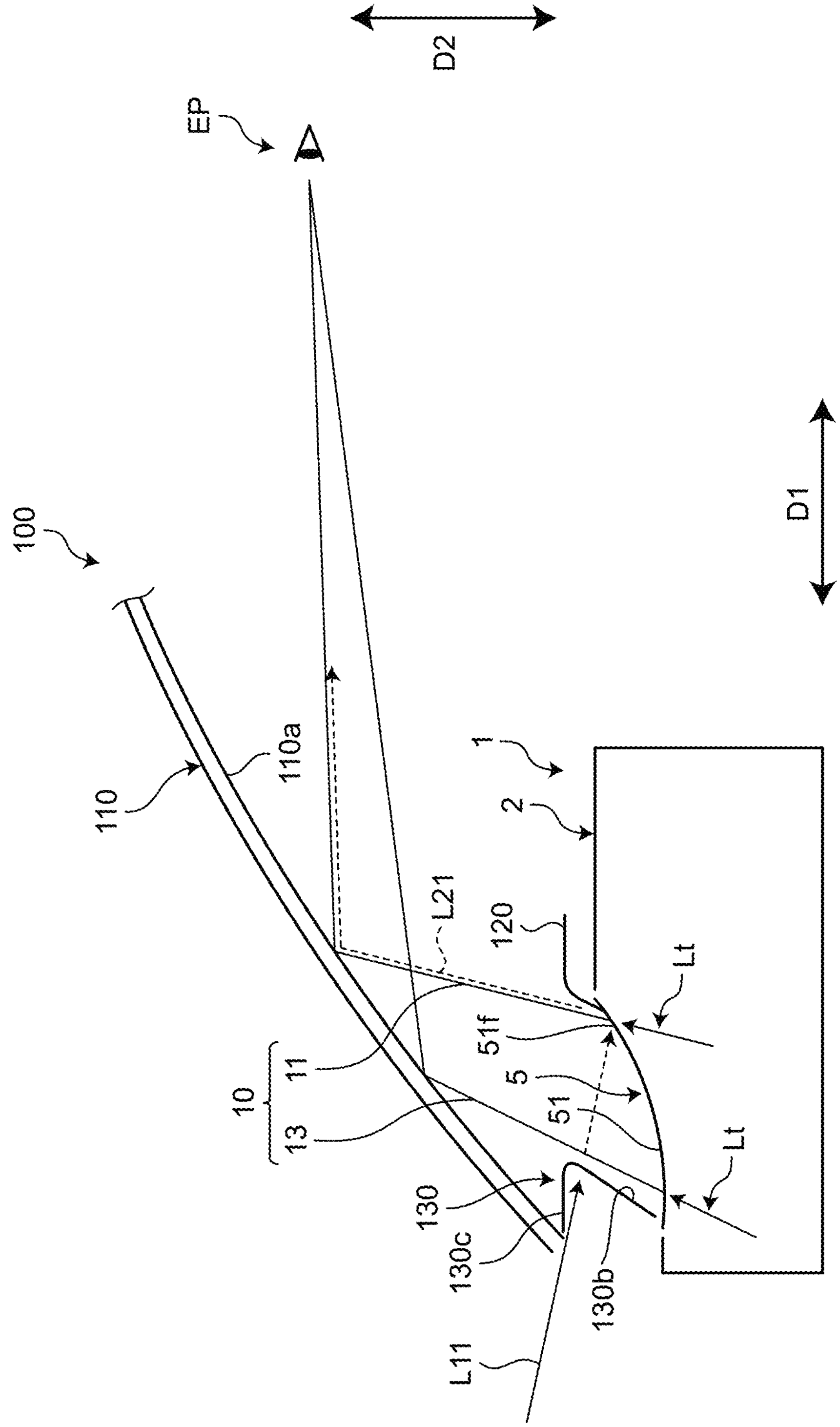
FIG. 3 is a cross-sectional view of the vehicle display device according to the embodiment.
Figure 4:
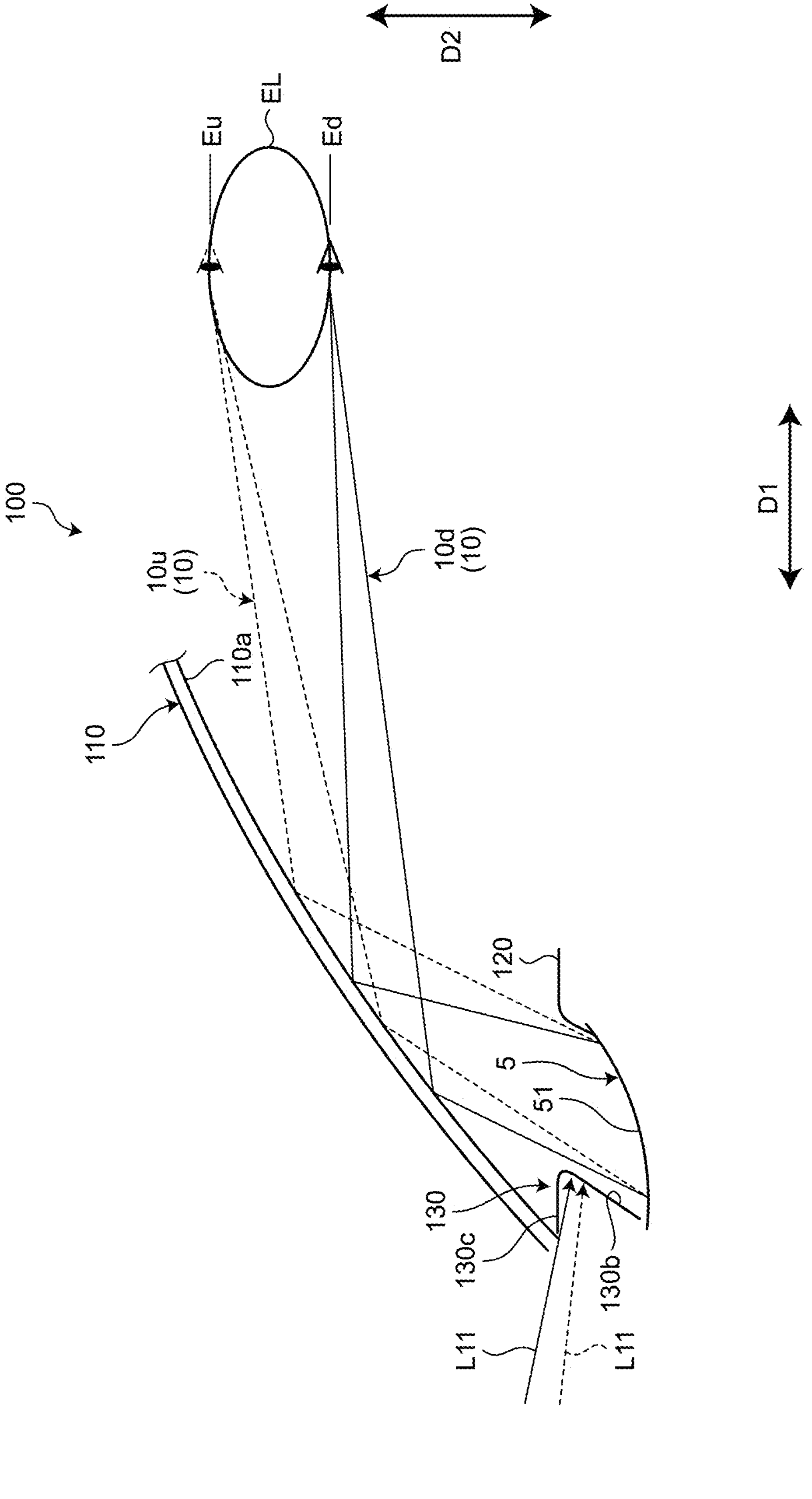
FIG. 4 is a view illustrating optical paths corresponding to an upper end and a lower end of an eye point.
Figure 5:
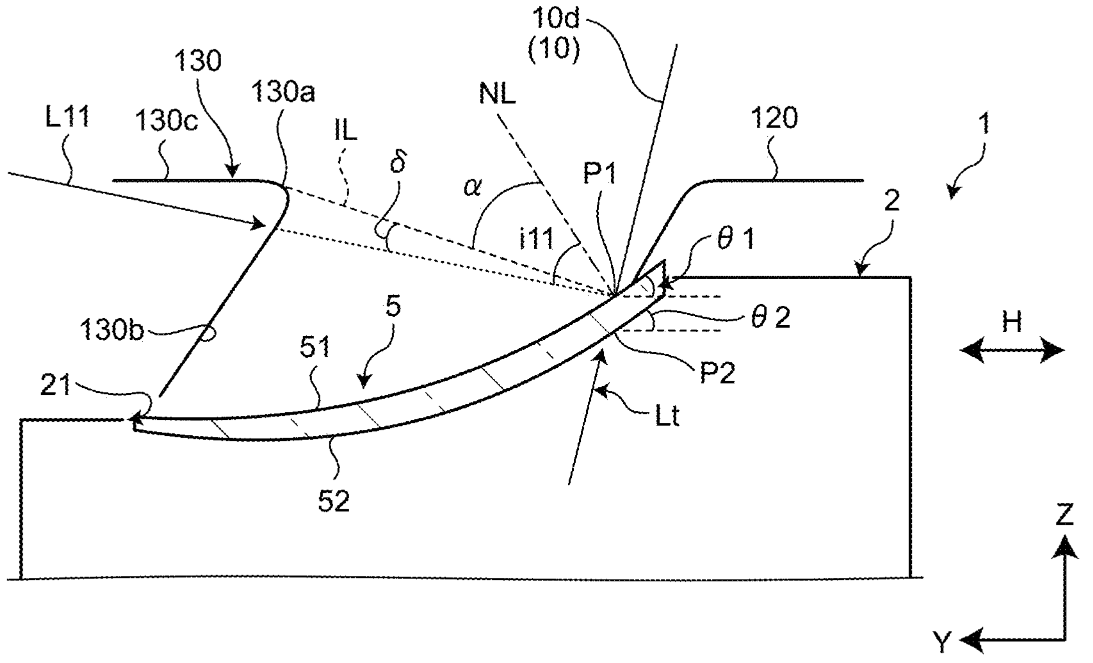
FIG. 5 is a view for describing a first incident angle and a lower limit angle.
Figure 6:
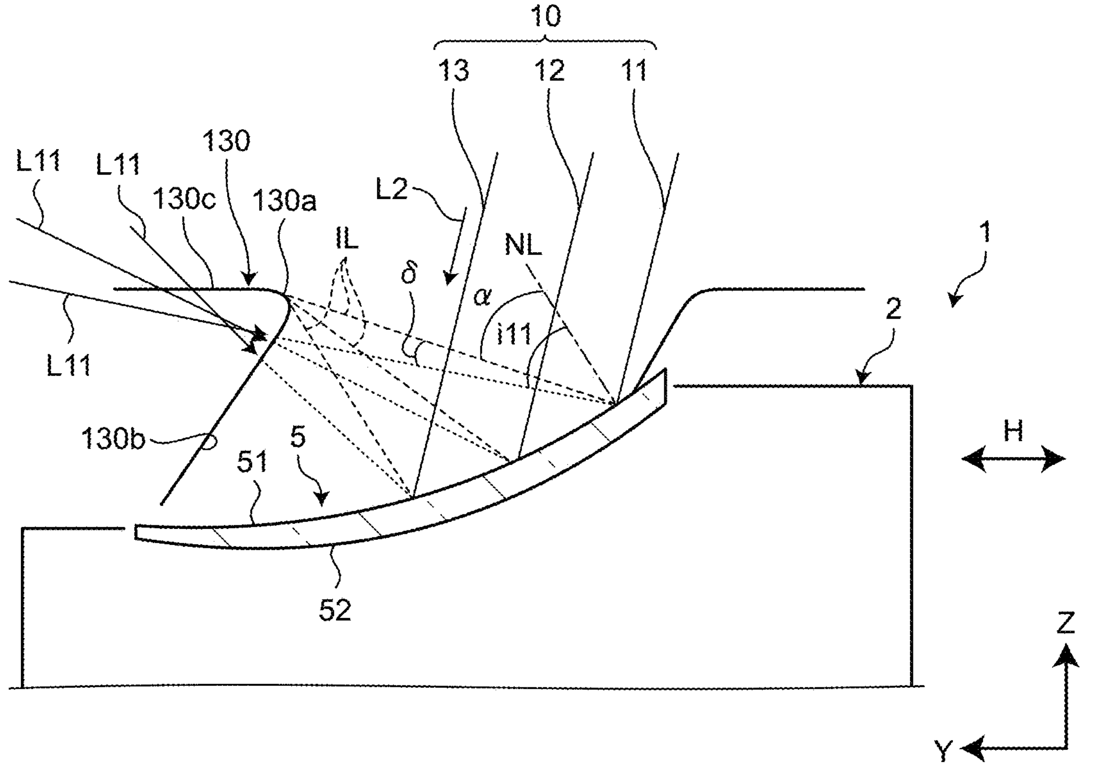
FIG. 6 is a view illustrating first external light for each point of a cover.
Figure 7:
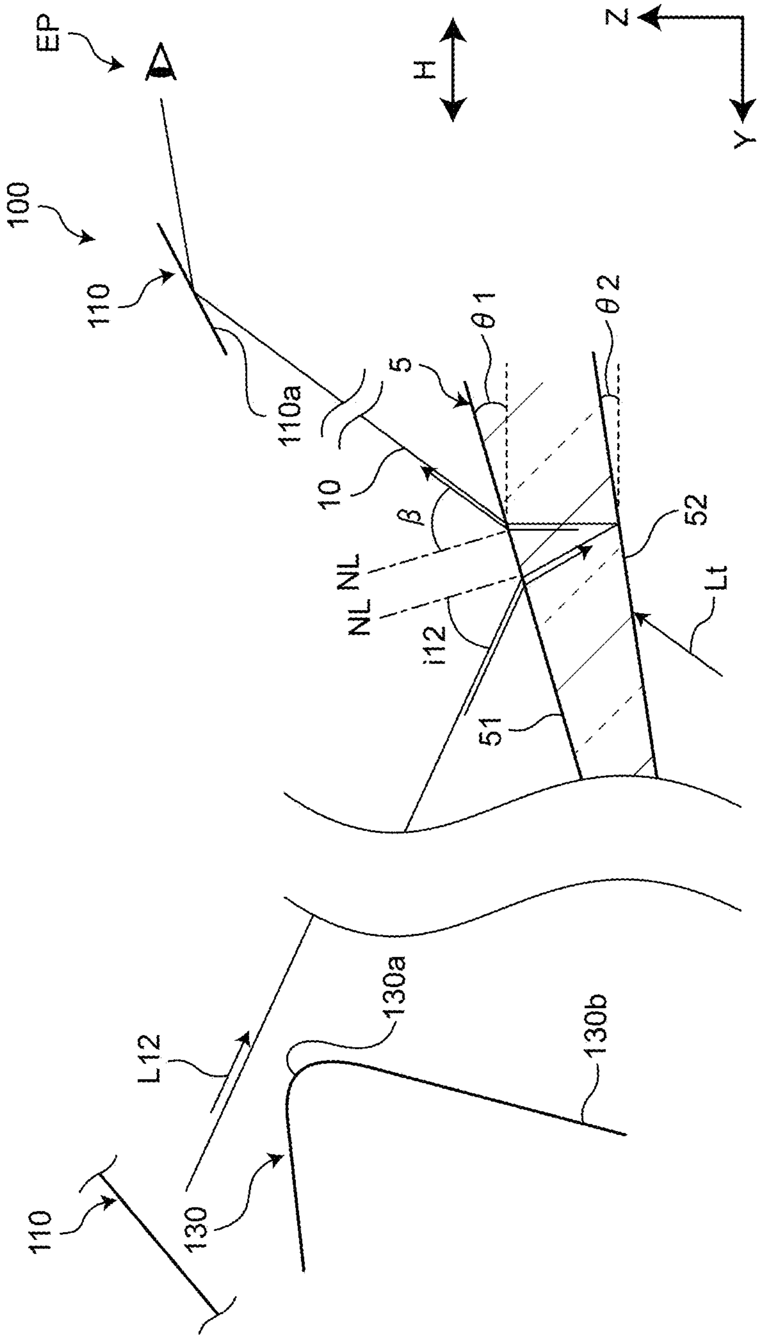
FIG. 7 is a view illustrating external light reflected toward the eye point.
Figure 8:
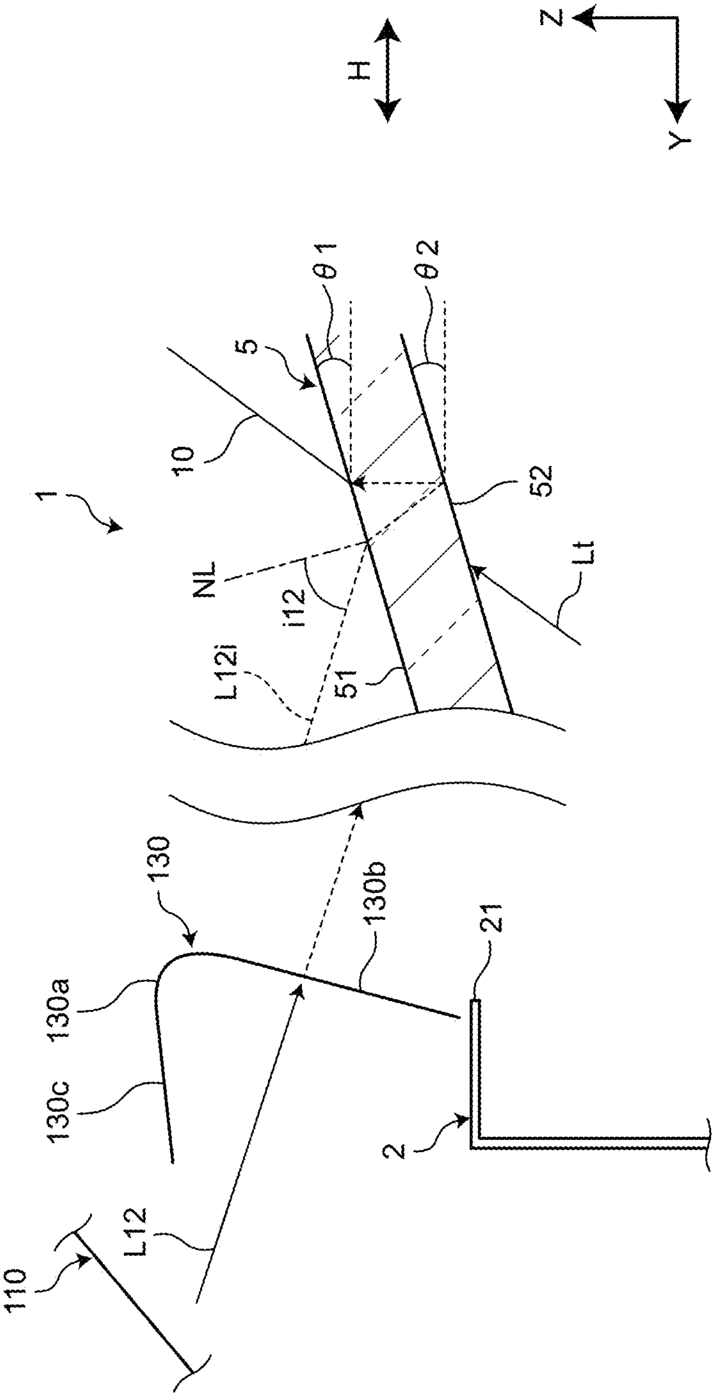
FIG. 8 is a view illustrating second external light blocked by a light-blocking wall.
Figure 9:
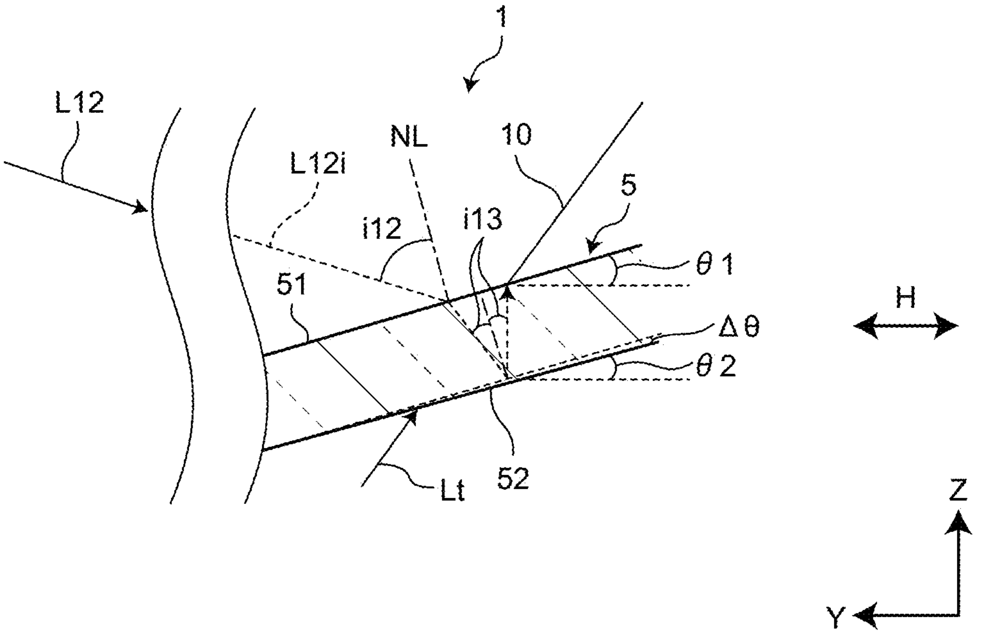
FIG. 9 is a view for describing a method of setting an angular difference.

An embodiment will be described with reference to FIGS. 1 to 9. The present embodiment relates to a vehicle display device. FIG. 1 is a view illustrating a vehicle on which the vehicle display device according to the embodiment is mounted, FIG. 2 is a perspective view of the vehicle display device according to the embodiment, FIG. 3 is a cross-sectional view of the vehicle display device according to the embodiment, FIG. 4 is a view illustrating optical paths corresponding to an upper end and a lower end of an eye point, FIG. 5 is a view for describing a first incident angle and a lower limit angle, FIG. 6 is a view illustrating first external light for each point of a cover, FIG. 7 is a view illustrating external light reflected toward the eye point, FIG. 8 is a view illustrating second external light blocked by a light-blocking wall, and FIG. 9 is a view for describing a method of setting an angular difference.

As illustrated in FIG. 1, a vehicle display device 1 according to the present embodiment is a head-up display device mounted on a vehicle 100 such as an automobile. The vehicle display device 1 projects display light Lt of an image toward a windshield 110. The windshield 110 is positioned on a front side of the vehicle and in front of an eye point EP of the vehicle 100 and faces the eye point EP in a vehicle front-rear direction D1. The display light Lt is reflected toward the eye point EP by a reflective surface 110*a* of the windshield 110. A driver of the vehicle 100 can visually recognize a virtual image Vi by the display light Lt. The virtual image Vi may be displayed in such a way as to be superimposed on an object in front of the vehicle 100. The virtual image Vi may be a meter image for the vehicle 100.

The vehicle display device 1 includes a housing 2, an image display device 3, a mirror 4, a cover 5, and a control unit 6. The housing 2 is disposed on the front side of the vehicle and in front of the eye point EP, and is housed in, for example, an instrument panel 120. The housing 2 is formed of a light-blocking material. The housing 2 has an opening 21 facing the windshield 110 in a vehicle top-bottom direction. The illustrated opening 21 is disposed on an upper surface of the housing 2 and is positioned at a front end portion of the housing 2.

The image display device 3 and the mirror 4 are disposed inside the housing 2. The image display device 3 is a device that outputs the display light Lt of the image. The illustrated image display device 3 includes a display 31 and a backlight unit 32. The display 31 is, for example, a liquid crystal display device such as a thin film transistor-liquid crystal display (TFT-LCD). The image display device 3 generates the display light Lt by light of the backlight unit 32. The display 31 and the backlight unit 32 are controlled by the control unit 6.

The mirror 4 is a reflective member that reflects the display light Lt toward the windshield 110. The mirror 4 has a concave reflective surface 41, and is configured to be able to enlarge the image. The reflective surface 41 of the mirror 4 is, for example, a free-form surface having an image correction function. More specifically, a shape of the reflective surface 41 is designed to correct image distortion caused when the display light Lt is reflected by the reflective surface 110*a* of the windshield 110. The display light Lt reflected by the reflective surface 41 is further reflected by the windshield 110 toward the eye point EP.

The cover 5 is disposed in the opening 21 of the housing 2 and closes the opening 21. The cover 5 is a transparent member, and is molded using, for example, a transparent resin. The cover 5 has a shape curved toward the inside of the housing 2. The curved shape of the cover 5 is determined in such a way as to reflect external light toward a light-blocking wall 130.

The light-blocking wall 130 is provided on the instrument panel 120. The light-blocking wall 130 has a low reflectance and can absorb external light. A surface shape of the light-blocking wall 130 may be a shape that diffuses light. The housing 2 is disposed on an eye point EP side of the light-blocking wall 130. More specifically, the housing 2 is disposed in such a way that the light-blocking wall 130 extends from a vehicle front side end portion of the opening 21 toward an upper side of the vehicle. That is, the light-blocking wall 130 is disposed on the front side of the vehicle and in front of the cover 5 and extends in a vehicle top-bottom direction D2. More specifically, the light-blocking wall 130 has a facing surface 130*b* extending in the vehicle top-bottom direction D2. The facing surface 130*b* is erected from the vehicle front side end portion of the opening 21 toward the upper side of the vehicle, and faces the eye point EP. The facing surface 130*b* is inclined with respect to the vehicle top-bottom direction D2 in such a way as to approach the eye point EP side as it goes toward the upper side of the upper side.

The cover 5 has an outer surface 51 and an inner surface 52. The outer surface 51 is a surface facing the upper side of the vehicle, and faces the windshield 110. The inner surface 52 faces a lower side of the vehicle and faces the mirror 4.

FIG. 2 is a perspective view of the cover 5. The cover 5 has a first direction X, a second direction Y, and a third direction Z. The first direction X is a direction corresponding to the image lateral direction of the virtual image Vi, and the second direction Y is a direction corresponding to an image longitudinal direction of the virtual image Vi. The third direction Z is the vehicle top-bottom direction. The third direction Z is, for example, orthogonal to the first direction X. As can be seen from FIGS. 1 and 2, the cover 5 has a shape curved toward the inside of the housing 2 on a YZ plane. The YZ plane is a cross section orthogonal to the image lateral direction. A shape of the outer surface 51 on the YZ plane is a curved shape, for example, an arc shape. The outer surface 51 is curved downward in the vehicle top-bottom direction. A shape of the outer surface 51 on an XZ plane is, for example, a linear shape.

As illustrated in FIG. 2, the outer surface 51 is formed to reflect external light L1 incident from above toward the light-blocking wall 130. The outer surface 51 has, for example, a shape capable of reflecting, toward the light-blocking wall 130, the external light L1 transmitted through the windshield 110 and incident on the outer surface 51. The light-blocking wall 130 can suppress external light reflected by the cover 5 from moving toward the eye point EP, and can improve visibility of the virtual image Vi. The illustrated outer surface 51 is inclined toward the lower side of the vehicle as the distance to the light-blocking wall 130 in the second direction Y decreases.

The inner surface 52 is a free-form surface. For example, a shape of the inner surface 52 on the YZ plane and a shape of the inner surface 52 on the XZ plane are free curves. The shape of the inner surface 52 is determined in such a way as to correct image distortion or aberration. The inner surface 52 is designed to correct, for example, at least one of distortion occurring on the reflective surface 41 of the mirror 4 or distortion occurring on the reflective surface 110*a* of the windshield 110. The inner surface 52 is designed to correct, for example, at least one of aberration occurring on the reflective surface 41 or aberration occurring on the reflective surface 110*a*. The inner surface 52 may correct both image distortion and aberration, and may correct either image distortion or aberration.

As described below, the light-blocking wall 130 is disposed in such a way as to shield the cover 5 from external light reflected toward the eye point EP. As illustrated in FIG. 1, the vehicle display device 1 has an optical path 10 of the display light Lt toward the eye point EP. The optical path 10 is an optical path of the display light Lt transmitted through the cover 5 and traveling toward the eye point EP. FIG. 1 illustrates, as part of the optical path 10, an optical path 11 corresponding to an upper end of the image, an optical path 13 corresponding to a lower end of the image, and an optical path 12 corresponding to the center of the image.

As described with reference to FIG. 3, when external light transmitted through the windshield 110 is reflected along the optical path 10 by the cover 5, the external light reaches the eye point EP and deteriorates the visibility of the image.

FIG. 3 illustrates first external light L11. The first external light L11 is external light reflected by the outer surface 51 toward the eye point EP in external light transmitted through the windshield 110 toward the cover 5 in a case where it is assumed that there is no light-blocking wall 130. In a case where it is assumed that there is no light-blocking wall 130, the first external light L11 passes through a position of the light-blocking wall 130 and is incident on a reflection position 51*f* of the outer surface 51. An incident angle of the first external light L11 with respect to the reflection position 51*f* is an angle at which the first external light L11 is reflected along the optical path 10 toward the eye point EP. In a case where there is no light-blocking wall 130, reflected light L21 reflected by the outer surface 51 reaches the eye point EP along the optical path 10.

The shape and arrangement of the light-blocking wall 130 are determined in such a way that the cover 5 can be shielded from the first external light L11. In other words, the vehicle display device 1 is disposed in such a way that the first external light L11 is blocked by the cover 5. The vehicle display device 1 can improve the visibility of the virtual image Vi by blocking the first external light L11 with the light-blocking wall 130. In a case where the light-blocking wall 130 has an instrument panel surface 130*c*, the light-blocking wall 130 can block the first external light L11 by the instrument panel surface 130*c*. The instrument panel surface 130*c* is a surface facing the upper side of the vehicle, and extends from an upper end 130*a* of the facing surface 130*b* toward the windshield 110.

Here, as described with reference to FIG. 4, the optical path 10 of the display light Lt differs depending on the position of the eye. FIG. 4 illustrates an eyellipse EL of the vehicle 100. The eyellipse EL is a predetermined space region, and is a region assumed as a region in which the positions of the eyes of the driver are distributed. FIG. 4 illustrates two optical paths 10*d* and 10*u*. The solid optical path 10*d* is the optical path 10 in a case where the eye point EP is positioned at a lower end Ed of the eyellipse EL. The broken optical path 10*u* is the optical path 10 in a case where the eye point EP is positioned at an upper end Eu of the eyellipse EL.

As illustrated in FIG. 4, the incident angle of the first external light L11 with respect to the cover 5 also differs depending on a height position of the eye point EP. The first external light L11 indicated by a solid line in FIG. 4 corresponds to the eye point EP of the lower end Ed of the eyellipse EL. The first external light L11 indicated by a broken line in FIG. 4 corresponds to the eye point EP of the upper end Eu of the eyellipse EL. As can be seen from FIG. 4, as the eye point EP approaches the lower end Ed of the eyellipse EL, an intersection position of the first external light L11 and the light-blocking wall 130 moves upward. The light-blocking wall 130 of the present embodiment is configured to shield the cover 5 from the first external light L11 even in a case where the eye point EP is positioned at the lower end Ed of the eyellipse EL. In other words, the vehicle display device 1 is disposed in such a way that the first external light L11 corresponding to the lower end Ed of the eyellipse EL is blocked by the cover 5.

As described with reference to FIG. 5, each point of the cover 5 has a lower limit angle α. The lower limit angle α is an angle on the YZ plane, that is, an angle when viewed from the first direction X. Angles such as a first incident angle i11, a first inclination angle θ1, and a second inclination angle θ2 described below are all angles on the YZ plane, that is, angles when viewed from the first direction X.

The lower limit angle α is an inclination angle of an imaginary line IL with respect to a normal line NL at each point of the cover 5. The imaginary line IL is a straight line connecting each point of the cover 5 and the upper end 130*a* of the light-blocking wall 130. The first incident angle i11 is an incident angle in a case where the first external light L11 is incident on each point of the cover 5 when it is assumed that there is no light-blocking wall 130. The light-blocking wall 130 is provided in such a way that the lower limit angle α is smaller than the first incident angle i11 with respect to each point of the outer surface 51.

FIG. 6 illustrates the first external light L11 for each point of the cover 5. As illustrated in FIG. 6, the first external light L11 for each point is blocked by the light-blocking wall 130. That is, a position of the upper end 130*a* of the light-blocking wall 130 is set in such a way that the first external light L11 intersects the facing surface 130*b* for each point of the cover 5. On the other hand, the cover 5 is configured to be able to reflect light L2 and collect the light L2 on the light-blocking wall 130 in a case where the light L2 along the optical paths 11, 12, and 13 is incident on the outer surface 51. The shape of the outer surface 51 is a shape capable of collecting reflected light of the light L2 at positions below the upper end 130*a* of the light-blocking wall 130.

That is, the curved shape of the cover 5 is determined in such a way that the lower limit angle α is smaller than the first incident angle i11 at each point of the outer surface 51. In the following description, an angle difference between the first incident angle i11 and the lower limit angle α is simply referred to as a "difference δ".

Here, in the cover 5 of the present embodiment, since the inner surface 52 is a free-form surface, an angular difference occurs between the outer surface 51 and the inner surface 52. FIG. 5 illustrates the inclination angles θ1 and θ2 of the outer surface 51 and the inner surface 52 with respect to a reference direction H. The inclination angles θ1 and θ2 are angles on the YZ plane, that is, angles in a cross section orthogonal to the image lateral direction. The reference direction H is a direction common to the outer surface 51 and the inner surface 52, and is, for example, a horizontal direction.

The first inclination angle θ1 is an inclination angle of the outer surface 51 with respect to the reference direction H. The second inclination angle θ2 is an inclination angle of the inner surface 52 with respect to the reference direction H. In the following description, an angular difference between the first inclination angle θ1 and the second inclination angle θ2 is simply referred to as an "angular difference Δθ". A unit of angle is, for example, [°].

$$\Delta\theta = \theta 1 - \theta 2 \tag{1}$$

Since the cover 5 is curved, the first inclination angle θ1 and the second inclination angle θ2 are changed according to a position in the second direction Y. In the illustrated cover 5, the inclination angles θ1 and θ2 decrease toward the front side of the vehicle. Values of the inclination angles θ1 and θ2 in Formula (1) above are values of angles of portions facing each other in the outer surface 51 and the inner surface 52. For example, in FIG. 5, a point P1 and a point P2 face each other in the third direction Z. The points P1 and P2 are points at the same position in the second direction Y. The angular difference Δθ at the position is calculated from the first inclination angle θ1 at the point P1 and the second inclination angle θ2 at the point P2.

Here, in a case where the value of the angular difference Δθ is large, external light may be reflected by the inner surface 52 of the cover 5 toward the eye point EP as described with reference to FIG. 7. In a cover 5 of a comparative example illustrated in FIG. 7, an angular difference Δθ between a first inclination angle θ1 and a second inclination angle θ2 is large. The angular difference Δθ is provided in such a way that an inner surface 52 approaches an outer surface 51 as the distance from a light-blocking wall 130 decreases.

FIG. 7 illustrates second external light L12. The second external light L12 is a part of external light transmitted through a windshield 110 toward the cover 5. The second external light L12 is external light that is emitted from the outer surface 51 along an optical path 10 toward an eye point EP when incident on the cover 5 and reflected by the inner surface 52.

A condition under which external light reflected by the inner surface 52 is emitted along the optical path 10 is changed according to the angular difference Δθ. More specifically, an incident angle i12 of external light to be the second external light L12 is determined by an angle β formed by a normal line NL of the outer surface 51 and the optical path 10 and the angular difference Δθ. The incident angle i12 is an incident angle of the external light with respect to the outer surface 51.

A value of the incident angle i12 of the second external light L12 decreases as the angular difference Δθ increases. That is, in a case where the angular difference Δθ is set to be excessively large, the second external light L12 is incident on the cover 5 without being blocked by the light-blocking wall 130. In a case where the second external light L12 is reflected toward the eye point EP, visibility of a virtual image Vi deteriorates.

In the vehicle display device 1 of the present embodiment, as described below with reference to FIG. 8, the angular difference Δθ is limited in such a way that the second external light L12 is blocked by the light-blocking wall 130. In the cover 5 illustrated in FIG. 8, the angular difference Δθ between the first inclination angle θ1 and the second inclination angle θ2 is smaller than an upper limit value. The upper limit value is determined in such a way that the second external light L12 can be blocked by the light-blocking wall 130.

By setting the angular difference Δθ to a value within a limited range, the light-blocking wall 130 can shield the cover 5 from the second external light L12 as illustrated in FIG. 8. FIG. 8 illustrates a course L12*i* of the second external light L12 in a case where it is assumed that there is no light-blocking wall 130. The second external light L12 illustrated in FIG. 8 is external light that is reflected along the optical path 10 toward the eye point EP in a case where it is assumed that the external light is incident on the cover 5 and reflected by the inner surface 52. Since the course L12*i* intersects with the light-blocking wall 130, the second external light L12 cannot reach the cover 5. Therefore, the vehicle display device 1 of the present embodiment can suppress occurrence of ghosting or the like due to external light and improve the visibility of the virtual image Vi.

The upper limit of the angular difference Δθ may be determined as follows. FIG. 9 illustrates an incident angle and a reflection angle i13 of the second external light L12 with respect to the inner surface 52. The incident angle and the reflection angle i13 with respect to the inner surface 52 are changed according to the angular difference Δθ. Therefore, the incident angle i12 of the second external light L12 with respect to the outer surface 51 is affected by twice the set angular difference Δθ.

In the vehicle display device 1 of the present embodiment, the value of the angular difference Δθ is smaller than half of the difference δ illustrated in FIG. 5. For example, in a case where the difference δ at the point P1 of the outer surface 51 is 6°, the angular difference Δθ is smaller than 3°. Since the angular difference Δθ is smaller than half of the difference δ, the second external light L12 is blocked by the light-blocking wall 130, and the visibility of the virtual image Vi is improved. The angular difference Δθ may be sufficiently smaller than half of the difference δ. For example, in a case where the difference δ is 6°, the angular difference Δθ may be 1° or less.

The angular difference Δθ is preferably determined based on the optical path 10*d* when the eye point EP is positioned at the lower end Ed of the eyellipse EL. The angle β of the optical path 10 with respect to the normal line NL (see FIG. 7) is minimized when the eye point EP is at the lower end Ed of the eyellipse EL. Therefore, it is desirable that the angular difference Δθ is set in such a way that the second external light L12 reflected along the optical path 10*d* toward the lower end Ed of the eyellipse EL can be blocked by the light-blocking wall 130.

In addition, the light-blocking wall 130 is preferably provided in such a way as to be able to shield the eye point EP at the lower end Ed from the second external light L12. The light-blocking wall 130 disposed in this manner can improve the visibility of the virtual image Vi regardless of the height position of the eyes of the driver.

As described above, the vehicle display device 1 of the present embodiment includes the housing 2, the image display device 3, the mirror 4, and the transparent cover 5. The housing 2 is mounted on the vehicle 100 and has the opening 21 facing the windshield 110. The image display device 3 is disposed inside the housing 2 and outputs the display light Lt of the image. The mirror 4 is disposed inside the housing 2 and faces the windshield 110 via the opening 21. The mirror 4 reflects the display light Lt toward the windshield 110. The cover 5 is disposed in the opening 21. The housing 2 is disposed in such a way that the light-blocking wall 130 provided in the vehicle 100 extends from the vehicle front side end portion of the opening 21 toward the upper side of the vehicle.

The cover 5 has the outer surface 51 facing the windshield 110 and the inner surface 52 facing the mirror 4. The cover 5 has a shape curved toward the inside of the housing 2 in the cross section orthogonal to the image lateral direction. The light-blocking wall 130 shields the outer surface 51 from the first external light L11. The first external light L11 is external light reflected by the outer surface 51 along the optical path 10 toward the eye point EP of the vehicle 100 in external light transmitted through the windshield 110 toward the cover 5 in a case where it is assumed that there is no light-blocking wall 130.

The inner surface 52 of the cover 5 is a free-form surface formed to correct image distortion or aberration. The angular difference Δθ between the inner surface 52 and the outer surface 51 in the cross section is a value in a range in which the second external light L12 can be blocked by the light-blocking wall 130. The second external light L12 is external light that is reflected along the optical path 10 toward the eye point EP in a case where it is assumed that the external light is incident on the cover 5 and reflected by the inner surface 52 in external light transmitted through the windshield 110 toward the cover 5. The vehicle display device 1 of the present embodiment can suppress reflection of external light toward the eye point EP and improve the visibility of the virtual image Vi.

The angular difference Δθ of the present embodiment is set in such a way that the second external light L12 reflected along the optical path 10*d* by the inner surface 52 can be blocked by the light-blocking wall 130. The optical path 10*d* is the optical path 10 toward the lower end Ed of the eyellipse EL of the vehicle 100. Therefore, the vehicle display device 1 of the present embodiment can improve the visibility of the virtual image Vi for the entire eyellipse EL.

The angular difference Δθ of the present embodiment is smaller than half of the difference δ between the first incident angle i11 and the lower limit angle α on the outer surface 51. The first incident angle i11 is an incident angle at which the first external light L11 to be reflected by the outer surface 51 toward the lower end Ed of the eyellipse EL of the vehicle 100 is incident on the outer surface 51 when it is assumed that there is no light-blocking wall 130. The lower limit angle α is an inclination angle of the imaginary line IL with respect to the normal line NL of the outer surface 51. The imaginary line IL is a straight line connecting each position of the outer surface 51 and the upper end 130*a* of the light-blocking wall 130. Since the angular difference Δθ is smaller than half of the difference δ for each position of the outer surface 51, the second external light L12 can be appropriately blocked by the light-blocking wall 130.

In the vehicle display device 1 of the present embodiment, aberration correction is performed by the inner surface 52 of the cover 5. Therefore, it is possible to increase an enlargement magnification of the mirror 4 while maintaining the display quality. Therefore, it is possible to downsize the entire vehicle display device 1 by downsizing the mirror 4 and the image display device 3.

The contents disclosed in the above embodiment can be appropriately combined and executed.

In the vehicle display device according to the present embodiment, the inner surface of the cover is a free-form surface formed to correct image distortion or aberration, and the angular difference between the inner surface and the outer surface is a value in a range in which the second external light can be blocked by the light-blocking wall. The second external light is external light that is reflected along the optical path toward the eye point in a case where it is assumed that the external light is incident on the cover and reflected by the inner surface in the external light transmitted through the windshield toward the cover. The vehicle display device according to the present invention has an effect of achieving both improvement in image quality and suppression of ghosting.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
- a housing that is mounted on a vehicle and has an opening facing a windshield;
- an image display device that is disposed inside the housing and outputs display light of an image;
- a mirror that is disposed inside the housing, faces the windshield via the opening, and reflects the display light toward the windshield; and
- a transparent cover that is disposed in the opening, wherein
- the housing is disposed in such a way that a light-blocking wall provided in the vehicle extends from a vehicle front side end portion of the opening toward an upper side of the vehicle,
- the cover has an outer surface facing the windshield and an inner surface facing the mirror, and each of the outer surface and the inner surface has a shape curved toward an inside of the housing in a cross section orthogonal to an image lateral direction,
- the light-blocking wall shields the outer surface from first external light,
- the first external light is external light reflected by the outer surface along an optical path of the display light toward an eye point of the vehicle in external light transmitted through the windshield toward the cover in a case where it is assumed that there is no light-blocking wall,
- the inner surface is a free-form surface formed to correct distortion or aberration of the image,
- the outer surface has a first inclination angle in the cross-section and relative to a predetermined reference direction,
- the inner surface has a second inclination angle in the cross-section and relative to the predetermined direction,
- an angular difference between the first inclination angle and the second inclination angle is a value within a range in which second external light is blocked by the light-blocking wall, and
- the second external light is external light that is reflected along the optical path of the display light toward the eye point in a case where it is assumed that the external light is incident on the cover and reflected by the inner surface, in external light transmitted through the windshield toward the cover.

2. The vehicle display device according to claim 1, wherein
- the angular difference is set in such a way that the second external light reflected along an optical path of the display light toward a lower end of an eyellipse of the vehicle by the inner surface is blocked by the light-blocking wall.

3. The vehicle display device according to claim 2, wherein
- the angular difference is smaller than a half of a difference between a first incident angle and a lower limit angle on the outer surface,
- the first incident angle is an incident angle at which the first external light reflected by the outer surface toward the lower end of the eyellipse of the vehicle is incident on the outer surface,
- the lower limit angle is an inclination angle of an imaginary line with respect to a normal line of the outer surface, and
- the imaginary line is a straight line connecting each position of the outer surface and an upper end of the light-blocking wall.

4. The vehicle display device according to claim 1, wherein
- the angular difference is smaller than a half of a difference between a first incident angle and a lower limit angle on the outer surface,
- the first incident angle is an incident angle at which the first external light reflected by the outer surface toward a lower end of an eyellipse of the vehicle is incident on the outer surface,
- the lower limit angle is an inclination angle of an imaginary line with respect to a normal line of the outer surface, and
- the imaginary line is a straight line connecting each position of the outer surface and an upper end of the light-blocking wall.

5. The vehicle display device according to claim 1, wherein the predetermined reference direction is a horizontal direction.

* * * * *